(12) United States Patent
Goudarzi

(10) Patent No.: US 7,903,083 B2
(45) Date of Patent: Mar. 8, 2011

(54) MIXED-MODE ENCAPSULATED ELECTROPHORETIC DISPLAY FOR ELECTRONIC DEVICE

(75) Inventor: Vahid Goudarzi, Coral Springs, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 932 days.

(21) Appl. No.: 11/672,091

(22) Filed: Feb. 7, 2007

(65) Prior Publication Data
US 2008/0111786 A1    May 15, 2008

Related U.S. Application Data

(60) Provisional application No. 60/865,494, filed on Nov. 13, 2006.

(51) Int. Cl.
*G09G 3/34* (2006.01)
(52) U.S. Cl. .......................................................... 345/107
(58) Field of Classification Search .................. 345/107; 430/32
See application file for complete search history.

(56) References Cited

U.S. PATENT DOCUMENTS

| | | | |
|---|---|---|---|
| 6,680,485 B1 | 1/2004 | Carey et al. | |
| 6,741,385 B2 | 5/2004 | Ikeda et al. | |
| 7,110,164 B2 | 9/2006 | Paolini, Jr. et al. | |
| 7,414,776 B2 * | 8/2008 | Liu et al. | 359/296 |
| 7,457,028 B2 * | 11/2008 | Kanbe | 359/296 |
| 7,508,478 B2 * | 3/2009 | Kamiya et al. | 349/145 |
| 2004/0095522 A1 | 5/2004 | Lee et al. | |
| 2005/0206594 A1 | 9/2005 | Suzuki | |

FOREIGN PATENT DOCUMENTS

WO    9910769 A    3/1999

OTHER PUBLICATIONS

Patent Cooperation Treaty, "Notification of Transmittal of the International Search Report and the Written Opinion of the International Searching Authority, or the Declaration" for International Application No. PCT/US2007/082947, Apr. 24, 2008, pp. 1-11.

* cited by examiner

*Primary Examiner* — Regina Liang
*Assistant Examiner* — Tom V Sheng
(74) *Attorney, Agent, or Firm* — Scott M. Garrett; Sylvia Chen

(57) ABSTRACT

A substrate (104) has a region of conductor segments (110) and a matrix display driver (106) mounted on it. The matrix display driver is used for creating pixilated images or symbols, while the conductor segments are used for turning on or off iconic elements. An encapsulated electrophoretic display laminate (108) is mounted over both the matrix display driver and the region of conductor segments to form the mixed mode display.

18 Claims, 4 Drawing Sheets

400

500

MIXED-MODE ENCAPSULATED ELECTROPHORETIC DISPLAY FOR ELECTRONIC DEVICE

RELATED APPLICATION

This application is related to Provisional Application Ser. No. 60/865,494, filed Nov. 13, 2006. Applicant claims priority thereof.

FIELD OF THE INVENTION

The invention relates generally to graphical displays for electronic devices, and more particularly to encapsulated electrophoretic displays for size-constrained and mobile communication devices.

BACKGROUND OF THE INVENTION

Electronic devices typically use a graphical display to display information to a user of the device, and to indicate the status of various parameters of the device, such as battery charge level. There are a variety of display technologies in common use, including liquid crystal, light-emitting diode, and electrophoretic displays, to name a few of the more commonly used display technologies. Recently, a special type of electrophoretic display is becoming more popular. It uses encapsulated electrophoretic material. Bichromal electrically charged microspheres are encapsulated in small capsules to prevent the problems normally associated with electrophoretic displays, namely clustering and settling. Encapsulated electrophoretic displays are bistable, as well, meaning they can be set and then the power turned off and the display will retain the image of whatever is being displayed. Thus, it makes an excellent choice for portable, battery powered devices such as cellular phones.

Generally, displays can be categorized into one of two categories. First, there are displays designed for general purpose use. General purpose displays typically use an active matrix driven to provide control over individual pixel elements. The device outputs graphical information to be displayed to a display driver, which activates the appropriate pattern in the matrix such that a representation of the information is viewable to the user. A second type of display is a segmented display with segments formed into unique shapes or symbols to be displayed at a fixed location on the display. For example, a battery meter may be configured of several adjacent bar segments. These symbols are simply turned on or off in correspondence with the status of the subsystem or parameter of the device to which they pertain. The second category of display is simpler because it requires one less driver layer, and fewer drive conductors for the drive layer.

Each type of display has advantages and disadvantages. Matrix type displays are manufactured in high volume, and can be used to display a wide variety of random information. However, they are typically manufactured in specified sizes, and driving them requires a relatively complex layout. Segmented displays are simple, and are easily custom made, but may be more expensive. They also are fixed, and therefore can only display or indicate an image in the shape of their segments, or combinations of segments. Therefore there is a need for a display technology that takes advantage of both modes of driving the display.

SUMMARY OF THE INVENTION

The present invention discloses a mixed mode encapsulated electrophoretic display which is built on a substrate. A matrix display driver is mounted on the substrate to provide pixilation ability. One or more conductor segments are provided on a region of the substrate for generating images of icons and other complex graphical images with a very small number of electrical connections. An encapsulated electrophoretic laminate is mounted over both the matrix display driver and the conductor segments. The matrix display driver and conductor segments provide a voltage differential in the laminate to active the display elements in the laminate. The matrix display driver can produce any image, symbol, or character than can be created from the pixels. The resulting mixed mode display can have an irregular or non-rectangular shape.

The matrix display driver may be a thin film transistor (TFT) on glass matrix driver, and mounted within a cavity formed in the substrate. Alternatively, but not exclusively so, a TFT on plastic matrix maybe used as the matrix display driver. The TFT on plastic is a TFT matrix disposed on a plastic substrate. The TFT on plastic may simply be adhered to the surface of the substrate without the need for a cavity. The substrate may be a circuit board which provides electrical connections, runners, and various electric potentials to drive the display and display elements. The circuit board may further include a plurality of keypad targets formed on the same layer as the conductor elements used to drive the display.

In manufacturing the display, a substrate is provided with the conductor elements disposed thereon. The matrix display driver is mounted on the substrate, and the display laminate holding the encapsulated electrophoretic material is mounted over both the matrix display driver and the conductor segments. Then the edge of the display laminate may be sealed to the substrate.

The invention also provides an electronic device having a mixed mode encapsulated electrophoretic display in one embodiment of the invention. The electronic device includes a housing for holding the circuit board substrate. The housing has an opening through which the mixed more display can be viewed, and which is shaped in correspondence with the shape of display, but may be smaller so as to cover a periphery of the display for cosmetic purposes.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention provides a mixed mode encapsulated electrophoretic display for use with an electronic device. A portion of the display is driven by a matrix type driver for providing pixilation ability to generate any manner of characters, shapes, and provide the appearance of motion. Another portion of the display is driven by static segment elements in the shape of symbols to be displayed and which are either turned on or off.

Figure 1:
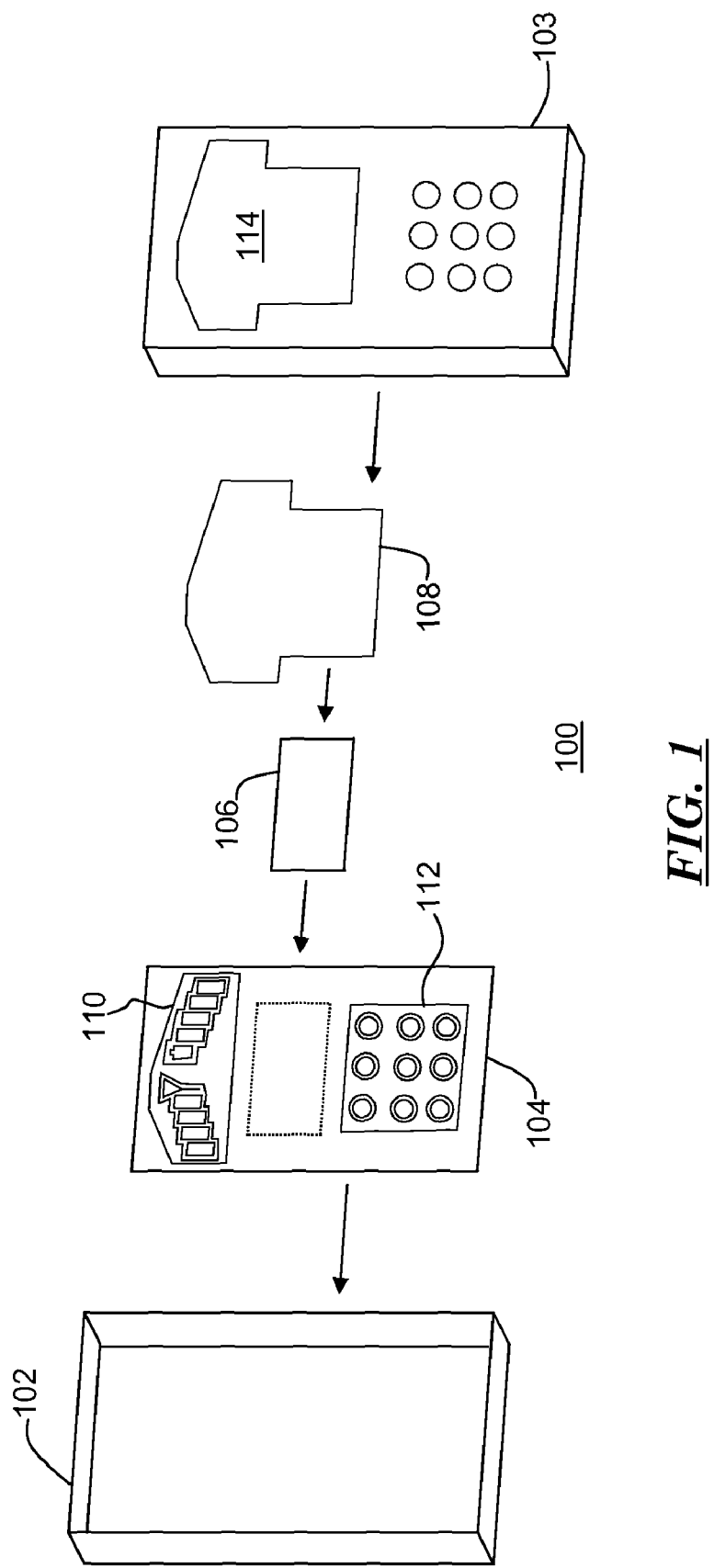
FIG. 1 shows an exploded isometric view of an electronic device using a mixed mode encapsulated electrophoretic display, in accordance with an embodiment of the invention.

Referring now to FIG. 1, there is shown an exploded isometric view of an electronic device 100 using a mixed mode encapsulated electrophoretic display, in accordance with an embodiment of the invention. Although the invention is useful in a wide variety of devices and applications, the exemplary device illustrated here is representative of a mobile communication device. The device typically has one or more housing portions 102, 103. The housing holds the device components together and helps to protect the device from moisture and particulate intrusion. Typically the device includes a circuit substrate, such as a circuit board 104. The circuit board carries circuit components, connectors, and other electrical structures and components.

According to the present embodiment of the invention, disposed on the circuit board is a matrix display driver 106. The matrix display driver is a matrix including a grid of X and Y addressable lines for electrically activating points on the matrix for generating pixels in a display medium. There are a variety of both passive and active matrix display driver technologies available. A common active matrix display driver is a thin film transistor (TFT) matrix. A TFT active matrix typically has one to four transistor controlling operation of each pixel. Active matrix display drivers are used commonly in flat panel liquid crystal displays because they are faster and produce a brighter display than passive matrix display drivers.

In addition to the matrix display driver 106, there is also a region of conductor segments 110 disposed on the circuit board. The conductor segments are shaped in the form of a symbol to be displayed, and have the advantage of being able to display a complex shape such as an icon without the need to generate the icon by pixilation. That means a single conductor line can be used to turn on or off the complex-shaped icon. For example, as shown in the present example, there is a provided a series of bars on the left to indicate signal strength, and a series of bars on the right to indicate battery charge level. As the signal strength and battery charge increases or decreases, a corresponding number of bars is displayed to the user for the given parameter. The conductor segments are used primarily for things such as icons that are either displayed or not displayed, depending on the state of the device. Because their shape is typically iconic, and of a size typically much greater than a pixel the conductor segments are not combined to create random images, symbol, or characters. That function is performed by the matrix display driver, as shall be seen. The conductor segments may be formed of conductor by etching, as is common in circuit boar fabrication.

Similarly, the circuit board may have a keypad region 112 including a plurality of keypad target conductor regions. Each of the keypad target conductors correspond to a key or button location of the keypad. The target conductors are so named because they resemble a target, with a center conductor surrounded by another conductor. Each button is arranged over its corresponding target conductor, and when pressed by the user, a conductive portion on the back of the key or button electrically connects the two conductors forming the target. At least one of the target conductors is provided with an electric potential, and the change in the potential when the button is pressed is sensed by a keypad circuit, as is known. Although referred to as target conductors, those skilled in the art will appreciate that the conductors can be arranged in many forms.

To form the mixed mode display, an encapsulated electrophoretic laminate 108 is mounted over both the matrix display driver 106 and the region of conductor segments 110. The encapsulated electrophoretic laminate provides a non-emissive display that is sometimes referred to as "electronic paper" because it can be made to resemble paper. The laminate includes a dispersion layer which includes tiny capsules which contain charged bichromal microspheres. These microspheres rotate depending on the polarity of an electric field applied to them. The capsules prevent migration of the microspheres. Once the microspheres in a given region are rotated to the desired orientation, the voltage may be shut off and the microspheres will remain in the desired orientation.

The matrix display driver 106 and the conductor segments are used to control orientation of microspheres in the encapsulated electrophoretic display laminate in the regions of the display laminate over the conductor segments and matrix display driver. The matrix display driver is used for its ability to control the display in a pixilated manner for display of information that is best suited to pixilated display. The conductor segments are used to control various device icons which are either turned on or off in accordance with the state of the device or a mode of operation of the device. An advantage of the encapsulated electrophoretic display laminate is that it can be easily manufactured in any planar shape. The display laminate is typically manufactured in sheets which can be cut to a desired shape and appropriately sealed. Matrix display drivers, being in the shape of a matrix, i.e. rectangular, can only vary in length and width. Thus, by combining both the matrix display driver and the conductor segments with the display laminate, a display having an irregular shape but with a region that can be controlled to the pixel level, and having simple icons that do not require complex matrix drive is possible. The mixed mode encapsulated display is viewable through an opening 114 in a housing of the device. The opening may be sized in correspondence with the display laminate, but made smaller so as to cover a perimeter of the display laminate.

Figure 2:
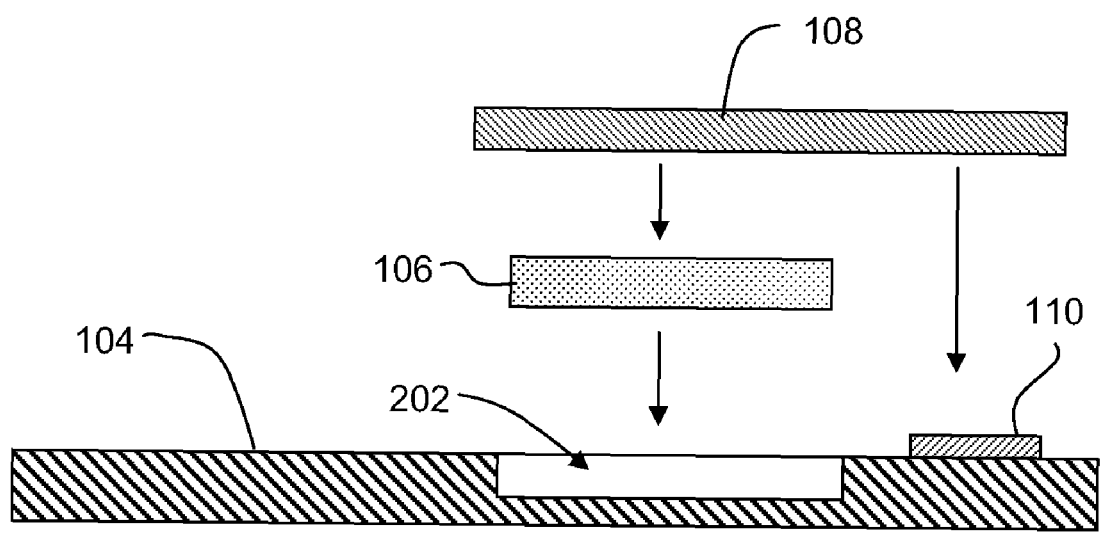
FIG. 2 shows a exploded side cut-away view of a mixed mode encapsulated electrophoretic display, in accordance with an embodiment of the invention.
Figure 3:
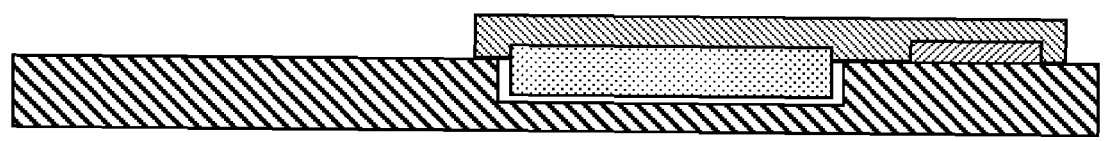
FIG. 3 shows a side cut-away view of a mixed mode encapsulated electrophoretic display, in accordance with an embodiment of the invention.

Referring now to FIGS. 2 and 3, there are shown, respectively an exploded cut-away view 200 and an assembled cut-away view 300 of a mixed mode encapsulated electrophoretic display, in accordance with an embodiment of the invention. It should be noted that the elements shown here are for example only, they are not intended to be to scale, and only serve to represent the elements in a manner that will be understood by those familiar with the art.

The display is formed on a substrate formed of electrically insulative material, such as, for example, a circuit board 104. The display could equally be disposed on other materials, but as various electrical connections will be made to the display, a circuit board is preferable. The main display elements of the matrix display driver 106, conductor segments 110, and the display laminate 108 are assembled together. The display laminate 108 covers both the conductor segments and the matrix display driver. In the present embodiment, the matrix display driver is a TFT on glass driver. To accommodate the TFT on glass driver, a cavity or opening 202 may be formed in the substrate so that the top surface of the TFT on glass driver is substantially lowered so as not cause undesired bumps in the display. FIG. 3 shows a representation of the assembled display. Note that because the encapsulated electrophoretic layer of the laminate may be a gel dispersion, allowing the capsules to move if forced, the laminate can accommodate some unevenness on the surface to which is it mounted, such as small differences in height, and still remain substantially flat on the top of the display viewable by the user. The TFT on glass matrix requires a driver circuit to drive the matrix. The electronic driver circuit used for driving the matrix may be disposed on the glass substrate along with the TFT matrix element. Alternatively, the driver circuit may be disposed on the substrate 104 and electrically connected to the TFT element.

Figure 4:
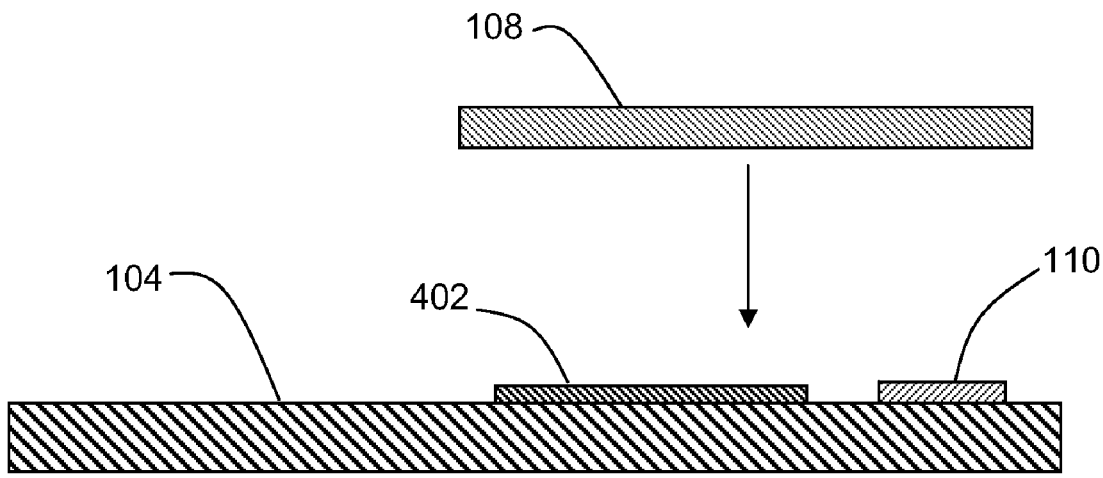
FIG. 4 shows a exploded side cut-away view of a mixed mode encapsulated electrophoretic display, in accordance with an alternative embodiment of the invention.
Figure 5:
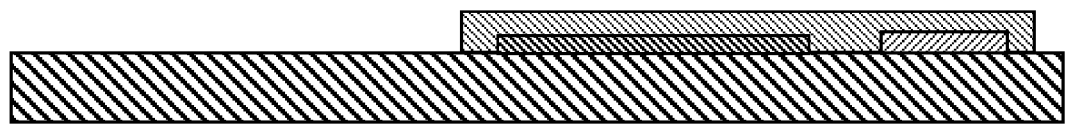
FIG. 5 shows a side cut-away view of a mixed mode encapsulated electrophoretic display, in accordance with an alternative embodiment of the invention.

FIGS. 4 and 5 show, respectively show an exploded cut-away view 400 and an assembled cut-away view 500 of a mixed mode encapsulated electrophoretic display, in accordance with an alternative embodiment of the invention. In the present alternative embodiment, instead of a TFT on glass matrix display driver being used, a thinner TFT matrix display driver 402 is used. The thin TFT matrix display driver uses a plastic or flexible substrate. TFT on plastic substrates have been known in the industry, but have not yet gained widespread acceptance in the marketplace. An example of a TFT on plastic may be found in U.S. Pat. No. 6,680,485, entitled "Thin film transistors on plastic substrates," issued Jan. 20, 2004. By using the thin TFT matrix driver, the need for a cavity into which to mount the matrix display driver may be avoided. The thickness of the thin TFT matrix driver may be small enough that the dispersion layer of the encapsulated electrophoretic laminate can absorb the height differences without substantial deformation of the viewing surface.

Figure 6:
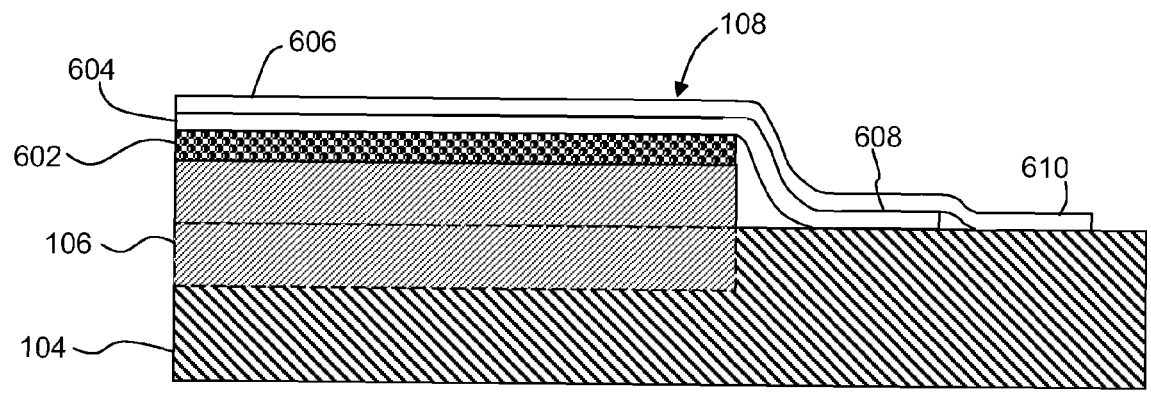
FIG. 6 shows a cross-sectional view of a mixed mode encapsulated electrophoretic display illustrating a manner of sealing the display, in accordance with an embodiment of the invention.

Referring now to FIG. 6, there is shown a cross-sectional view 600 of a mixed mode encapsulated electrophoretic display illustrating a manner of sealing the display, in accordance with an embodiment of the invention. Again, the scale of elements show here is not meant to be representative of the actual scale and size relation of the elements. In fact the scale differences have been exaggerated for the sake of clarity.

In the present embodiment, the TFT on glass matrix display driver 106 is shown, mounted in a cavity of the substrate circuit board 104. The encapsulated electrophoretic display laminate 108 is comprised of 3 layers. First the encapsulated electrophoretic dispersion 602 is disposed directly adjacent the matrix driver 106. The encapsulated electrophoretic dispersion contains the capsules containing the bichromal microspheres. The capsules are dispersed in a gel or gel-like material binder for holding the capsules. The bichromal particles contained in the capsules have relatively free movement within the capsules.

Overlaying the encapsulated electrophoretic layer 602 is a layer of transparent conductor 604, such as indium-tin oxide. The transparent conductor layer 604 provides a reference electric potential. The matrix display driver and the conductor segments provide a voltage differential relative to that applied to the transparent conductor to cause the bichromal microspheres to move, resulting in the display of the desired image. Overlaying the transparent conductor is a cover layer of transparent substrate that is a non-conductor, such as a plastic. The cover layer protects the inner two layers, and also provides a sealing edge. The transparent conductor is electrically connected to the circuit board at 608. The cover layer is bonded or otherwise sealed to the circuit board at 610. The sealing may be done through heat bonding, adhesive, and so on. The sealing is performed around the perimeter of the display. For cosmetic reasons, the housing of the device 103 may have an opening 114 slightly smaller than the display to cover the periphery of the display.

The encapsulated electrophoretic laminate is typically provided with a backing that is removed prior to mounting on the circuit board. The backing holds the encapsulated electrophoretic material and binder in place. In manufacturing the display, the backing may be removed. The substrate is provided with conductor segments, and the matrix display driver is them mounted on the substrate. Then the encapsulated electrophoretic laminate is mounted over the matrix display driver and the conductor segments. Then the display laminate is sealed.

Figure 7:
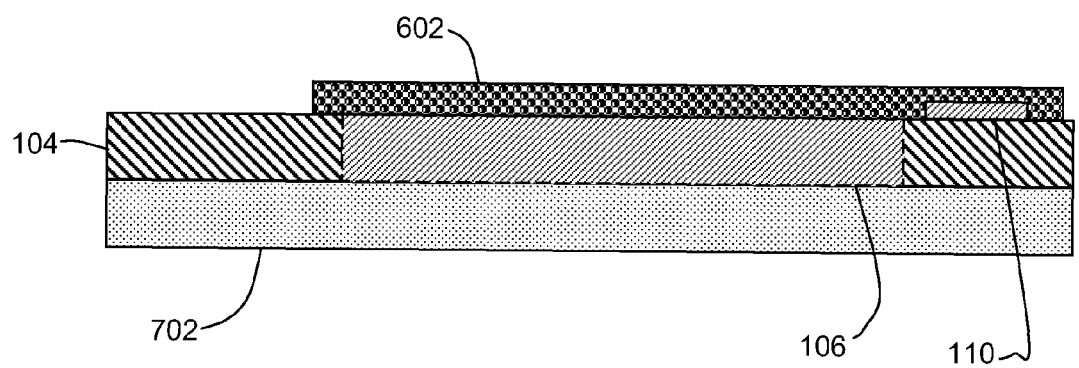
FIG. 7 shows a cross sectional view of a mixed mode encapsulated electrophoretic display assembly in a mobile communication device, in accordance with an alternative embodiment of the invention.

Referring now to FIG. 7, there is shown a cross sectional view 700 of a mixed mode encapsulated electrophoretic display assembled in an mobile communication device in accordance with an embodiment of the invention. In the present embodiment, the substrate 104 accommodates the matrix display driver 106 in an opening of the substrate. The matrix display driver is disposed on a backing substrate 702 and fits into the opening in the substrate 104. The encapsulated electrophoretic display laminate is then disposed over the matrix display driver 104 and the conductor segment 110 to form the mixed mode display. Whether the matrix display driver is mounted in an opening of the substrate as shown in FIG. 7, or mounted in a cavity of the substrate as in FIGS. 2-3, or mounted on the surface of the substrate as shown in FIGS. 3-4, the matrix display driver is said to simply be mounted in correspondence with the surface of the substrate.

This invention can be embodied in other forms without departing from the spirit or essential attributes thereof. Accordingly, reference should be made to the following claims, rather than to the foregoing specification, as indicating the scope of the invention.

What is claimed is:

1. A mixed mode encapsulated electrophoretic display for an electronic device, comprising:
   a substrate fabricated of a electrically insulative material;
   a matrix display driver disposed in a cavity in the substrate;
   a region of conductor segments in the shape of symbols to be displayed disposed on the substrate; and
   an encapsulated electrophoretic laminate disposed over both the matrix display driver and the region of conductor segments, the encapsulated electrophoretic laminate including a layer of encapsulated electrophoretic material and a transparent conductor layer disposed over the encapsulated electrophoretic layer.

2. A mixed mode encapsulated electrophoretic display as defined in claim 1, wherein the matrix display driver is a thin film transistor matrix display driver.

3. A mixed mode encapsulated electrophoretic display as defined in claim 2, wherein the thin film transistor matrix is disposed on glass.

4. A mixed mode encapsulated electrophoretic display as defined in claim 2, wherein the thin film transistor matrix is disposed on a plastic member that is adhered to the substrate.

5. A mixed mode encapsulated electrophoretic display as defined in claim 1, wherein the encapsulated electrophoretic laminate has a perimeter which is sealed to the substrate.

6. A mixed mode encapsulated electrophoretic display as defined in claim 1, wherein the substrate is a circuit board, the circuit board having a surface on which the matrix display driver and region of conductor segments is disposed, the circuit board further comprising a keypad region including a plurality of keypad target conductor regions each corresponding to a key location.

7. A mixed mode encapsulated electrophoretic display as defined in claim 6, wherein the transparent conductor layer of the encapsulated electrophoretic laminate is electrically coupled to the circuit board.

8. A method of manufacturing a mixed mode encapsulated electrophoretic display for an electronic device, comprising:
providing a substrate fabricated of an electrically insulative material;
mounting a matrix display driver in a cavity in the substrate;
providing a region of conductor segments in the shape of symbols to be displayed on the substrate; and
mounting an encapsulated electrophoretic laminate over both the matrix display driver and the region of conductor segments, the encapsulated electrophoretic laminate including a layer of encapsulated electrophoretic material and a transparent conductor layer disposed over the encapsulated electrophoretic layer.

9. A method of manufacturing a mixed mode encapsulated electrophoretic display as defined in claim 8, wherein mounting a matrix display driver on the substrate comprises mounting a thin film transistor matrix display driver on the substrate.

10. A method of manufacturing a mixed mode encapsulated electrophoretic display as defined in claim 9, wherein the thin film transistor matrix display driver is disposed on a glass carrier.

11. A method of manufacturing a mixed mode encapsulated electrophoretic display as defined in claim 9, wherein the thin film transistor matrix is disposed on a plastic substrate, mounting the thin film transistor matrix on the substrate comprises adhering the thin film transistor matrix to the substrate.

12. A method of manufacturing a mixed mode encapsulated electrophoretic display as defined in claim 8, further comprising sealing a perimeter of the encapsulated electrophoretic laminate to the substrate.

13. A method of manufacturing a mixed mode encapsulated electrophoretic display as defined in claim 8, wherein providing the substrate comprises providing a circuit board, the circuit board having a surface on which the matrix display driver is mounted and the region of conductor segments is provided, the circuit board is further provided with a keypad region including a plurality of keypad target conductor regions each corresponding to a key location.

14. A method of manufacturing a mixed mode encapsulated electrophoretic display as defined in claim 13, further comprising electrically connecting the transparent conductor layer of the encapsulated electrophoretic laminate to the circuit board.

15. An electronic device, comprising:
a circuit board having a surface;
a matrix display driver mounted in correspondence with the surface of the circuit board;
a region of conductor segments in the shape of symbols to be displayed on the substrate disposed on surface of the circuit board;
an encapsulated electrophoretic laminate mounted on the circuit board, and covering both the matrix display driver and the region of conductor segments and sealed to the circuit board, and further having a layer of encapsulated electrophoretic material and a transparent conductor layer disposed over the encapsulated electrophoretic layer, wherein the transparent conductor layer is electrically coupled to the circuit board; and
a housing having a front portion having an opening shaped in correspondence with the electrophoretic laminate, and covering a periphery of the encapsulated electrophoretic laminate.

16. An electronic device as defined in claim 15, wherein the matrix display driver is mounted in a cavity in the circuit board.

17. An electronic device as defined in claim 15, wherein the circuit board further comprises a keypad region including a plurality of keypad target conductor regions each corresponding to a key location.

18. An electronic device as defined in claim 15, wherein the matrix display driver is a thin film transistor matrix display driver.

* * * * *